United States Patent Office 3,702,261
Patented Nov. 7, 1972

3,702,261
METHOD OF PROVIDING SUBSTRATES WITH STIFF REINFORCING MATERIAL
Frank Feakes, Lexington, and Gabriel E. Padawer, Brookline, Mass., assignors to National Research Corporation, Worcester, Mass.
Filed Jan. 22, 1969, Ser. No. 792,969
Int. Cl. C23c 11/00
U.S. Cl. 117—106 R 10 Claims

ABSTRACT OF THE DISCLOSURE

Structural composites utilizing high stiffness reinforcement are made up of laminated elements. Each basic laminated element is made by vacuum coating opposed faces of a substrate in alternation with several layers of coating applied to each face to achieve total coating thickness. The resultant product is an improved laminate of flat, high strength reinforcing layers of uniform thickness.

---

The present invention relates to composite materials which are useful for wall panels, structural members and component parts such as turbine and compressor blades—particularly where strength stiffness and light weight consistent with high temperature usage are desired.

It is already known to utilize the high strength, high stiffness materials—aluminum oxide, boron, boron carbide, carbon, silicon carbide, titanium boride, titanium carbide, aluminum boride, and beryllium as reinforcing members in a ductile matrix such as plastic or light metals to form a composite. It is also known to utilize some of these materials in film form as laminate composites with layers of high strength, stiff reinforcement alternating with layers of matrix material to provide mechanical properties which are isotropic in the laminate plane. It is also known that the composite strength and stiffness vary substantially according to the percentage of reinforcement and matrix and a rule of mixtures analysis. It is known to produce laminate reinforcement by vacuum coating a stiff material on a substrate layer of ductile material and laminating a plurality of such coated layers.

The objects of the invention are to provide such composites of improved strength through the improvement of inherent reinforcement strength, volume content and flatness.

The invention comprises an improved process for making reinforcement and composite and the resulting reinforcement and composite products.

In general, the improved reinforcement making process comprises (a) supporting a core substrate of ductile material (e.g. polyimide, aluminum, titanium) and a charge of one of the above mentioned stiff materials in a chamber in line of sight relationship to each other, (b) evacuating the chamber to produce a hard vacuum therein, (c) evaporating (from a melt or by sublimation from a solid) the stiff material so that vapors therefrom stream towards the substrate to coat the substrate and simultaneously heating the substrate, using heat from the vapor source and/or separate heaters, (d) changing the relative orientation of substrate and source in a series of repetitive cycles so that alternate opposed faces of the substrate are coated in different periods of each cycle, the coating thickness being limited to no greater than .05 mil thick per face per cycle, and preferably substantially less thickness. The cyclic alternate coating of opposed faces is continued until a coating thickness of .10 mil, and preferably over .50 mil and up to about 1.50 mils to realize the full distinct advantages of the invention, has been built up on each face. The substrate may be a film patch or an elongated film web or a core shape such as a turbine blade form made of lightweight honeycomb. Preferably, the substrate is rotated to alternately expose opposing faces to a stationary vapor source. The coating rate is of step form with respect to time with a longer period for coating than for changing relative orientation of substrate and source.

The invention is based on a recognition of the vacuum coating problem which limit attainable reinforcement and composite properties. When very stiff materials of the kind involved here are evaporated, they require high heat inputs and the heat reaches the substrate. A high thickness of coating is required to gain the requisite volume fraction; minimum thickness of substrate is limited to that necessary for effective handling (about .25 mil polyimide plastic or .5 mil titanium foil). The coefficients of thermal expansion and contraction of the reinforcing material coatings and those of the ductile substrate materials are often mismatched. The conditions lead to problems of curling of coated substrates and cracking of coatings on a visible or microscopic scale as well as stresses within the coatings. These problems result in degraded properties of the coated substrates and laminates made therefrom. We have found that these problems can be substantially alleviated by the cyclic buildup of coating on opposed faces of the substrate. The first thin layer is readily accommodated in the substrate and then provides a backside stiffening reinforcement for the substrate to accommodate the next thin layer. The repetition of this cyclic coating prevents curling of the coated substrate and prevents cracking of the coating. Stresses due to mismatches of thermal coefficient of expansion (combined with temperature change) are accommodated by yielding of the substrate which remains able to transmit load stresses between stiff coating layers. The flate, coated substrates are readily formed into effective laminates.

The inherently equal thicknesses of the opposed coatings on the coated substrate is very desirable for laminating purposes.

Other objects, features and advantages of the invention will in part be obvious from and will in part be set forth in the following specific description of the invention which is to be read together with the accompanying drawings wherein.

Figure 1:
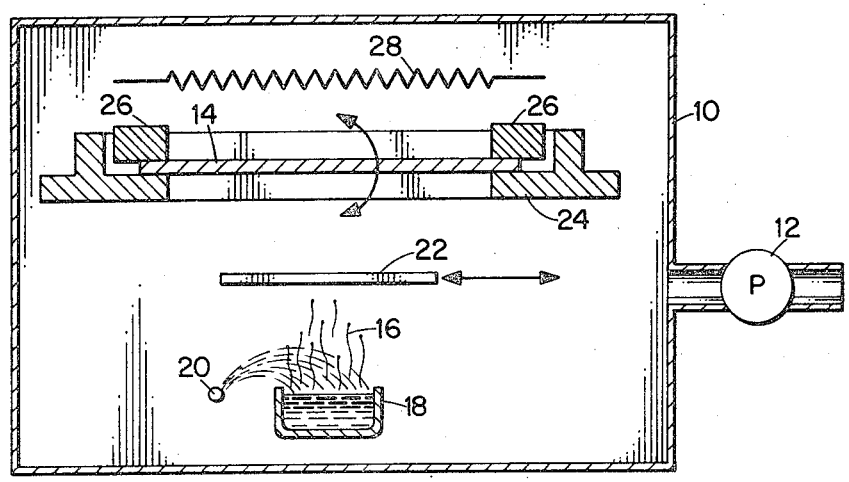
FIGS. 1-2 are schematic drawings showing apparatus used in a preferred species of the process of the invention to manufacture the composite reinforcement.

Referring to FIG. 1 there is indicated a conventional vacuum coating chamber 10 evacuated by a pump 12. Within the chamber is a substrate 14 to be coated by condensation of streaming vapors 16 emitted from a source 18 which is heated by an electron gun 20 which emits electrons to bombard the material contained in the source 18. A shutter 22 prevents coating by being held in a blocking position when the source is being warmed up and is moved aside later to allow coating.

The substrate 14 is mounted on a jig 24; it is fixed at its ends to the jig (see FIG. 2) with its side edges unsupported and clamped down by holding blocks 26 using screw clamps (not shown). A substrate heater is indicated at 28 (FIG. 1). The jig 24 is rotated by a drive (not shown) while the entire apparatus is under vacuum during coating operations.

In the beginning of a coating operation the chamber 10 is evacuated by pump 12 to pressures on the order of $10^{-4}$ mm. Hg and lower. The substrate is heated to a high temperature for bake-out. The temperature should be higher than any substrate temperature to be used in the later coating process. Typical bake-out temperatures are 650 degrees C. for a titanium substrate and 400 degrees C. for a polyimide film substrate. The electron gun is started to warm up the source. The shutter is in blocking position during warm-up. Then the substrate temperature is dropped about 25–50 degrees C. and the shutter is moved aside to allow coating to begin.

During coating, the substrate receives an initial small deposit of source material on one side and then is rapidly inverted and held with the other side facing the source to receive a similar small deposit. It is then rotated again. This is repeated in cyclic fashion so that the total coating on each side is built up over several layers and with the deposition of layers being alternated from one side to the other.

Figure 1A:
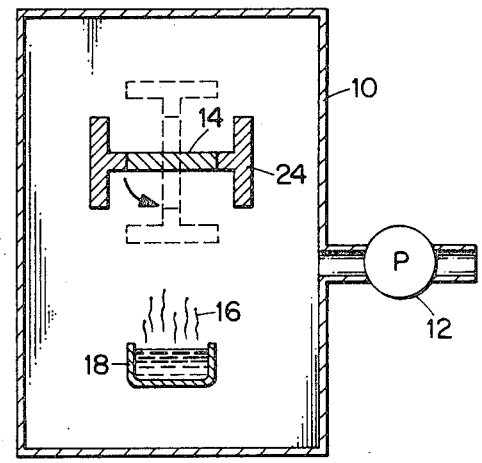

FIG. 1a shows the same apparatus in simplified form indicating an important function of the jig 24. This is to essentially prevent coating at a low acute angle (30 degrees or less) while rotating the jig. Such coatings tend to be highly stressed and to weaken the resultant product and avoidance of such coating is important in this and the other species of the invention.

The same limitation of coating to avoid deposition at an acute angle could be accomplished by cyclic-operation of shutter 22 in synchronism with rotation of the substrate.

EXAMPLE 1

Figure 2:
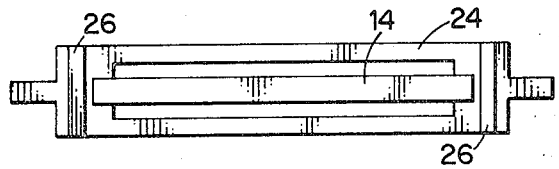

A substrate of .5 mil thick, 7/16 inch wide by 6½ inches long, titanium foil substrate was mounted in a vacuum coater arrangement as shown in FIGS. 1–2. The source was charged with boron carbide and preheated and coated in the manner described above. The coating took place over a period of 3 minutes with a 3–4 second exposure of each side of the substrate per cycle. There were 50 complete revolutions (2 half revolutions per cycle). A total coating of .113 mil of boron carbide was deposited on each side providing a total volume fraction of 26.7 percent boron carbide in the coated sample. The coated sample had a density of .116 pound per cubic inch.

The coated sample was mounted in a tensile tester and its elastic modulus (tensile) was determined to be $23.9 \times 10^6$ p.s.i. A stress of $36.8 \times 10^3$ p.s.i. was achieved without breaking the sample.

EXAMPLE 2

Another sample was coated as in Example 1 with the following changed conditions:

Substrate: .25 mil polyimide film (H-film)
Preheating: 400° C. for 6 hours
Coating time: 6 minutes
Rate of rotation: 80 full (360°) rotations at about 4.5 seconds per full rotation and 2 seconds coating per side per cycle
Coating temperature: 350° C. at start of coating drifting to 391° C. (at end of coating)
Coated substrate held vertical at completion of coating and during cool down and air release.

The resultant coated substrate had a coating of boron carbide of .187 mil thick per side to provide a total volume fraction of 61.4% boron carbide. The density was .0645 pound per cubic inch. The ultimate strength could not be determined because of a premature fracture in the portion held within the tensile tester chuck. However, a stress of $22.1 \times 10^3$ p.s.i. was achieved without failure.

Figure 3:
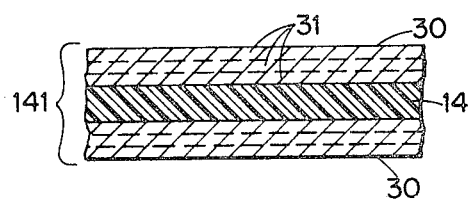
FIGS. 3–5b are cross-section views of non-laminated, single phase coated composite reinforcement; non-laminated multiphase, coated composite reinforcement and laminated composite reinforcement all according to the invention.

FIG. 3 is a schematic cross-section of a product made by the process described in Example 2. The substrate 14 is coated with coating layers of boron carbide 30 on each side of equal thickness. As noted above, each layer is composed of sub-layers 31 and the dashed lines in FIG. 3 indicate the sub-layering. However, a cross-section of the product observed under the microscope at 1000 times magnification does not show the sub-layering. This indicates a very high degree of adhesion between sub-layers and freedom from contamination. The product has a high degree of flatness compared to prior art coated films of this type, the principal limit on flatness being the original morphology of the substrate film. Each coating 30 is coherent within itself as observed at up to 1000 times magnification (and is indicated by the test results of Example 1). Although only three sub-layers are shown per coating layer, it should be understood that 50–100 sub-layers are more typical.

Figure 4:
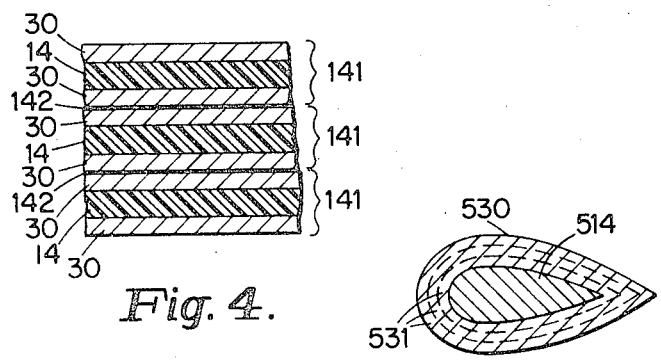

The best mode of use of the FIG. 3 product, or the like, is by laminating together several laminae of such a product to form a laminated composite material, useful for example as a wall or rib structure of an aircraft, building, package, etc. Such a laminate is indicated in FIG. 4. Three coated substrates 141 are laminated together with adhesive layers 142 of epoxy resin by combined application of pressure and heat in known fashion. The form of the laminate is improved over prior art structures because of the greater flatness of the unit elements 141. Where the substrate 14 is metallic, a metal adhesive layer 142, such as aluminum can be used effectively to provide a high temperature use laminate as a whole.

Figure 5:
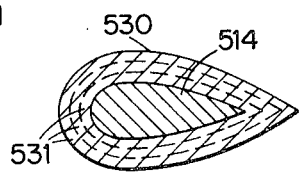

Another mode of use of the invention is indicated in FIG. 5. Here the substrate 514 may be a complex core object such as a solid or honeycomb turbine blade shape. This substrate is coated in a manner similar to that used for the FIG. 3 product. The stiff material coatings 530 are built up of sub-layers 531 in the same manner.

Figure 5A:
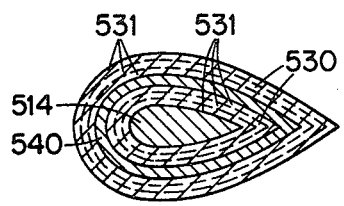

A variation of the FIG. 5 product is shown in FIG. 5a wherein groups of sub-layers 531 are sub-divided by a thicker (than a single sub-layer 531, but thinner than a sub-layer group 530) layer 540 of a relatively ductile material such as aluminum or titanium.

Figure 5B:
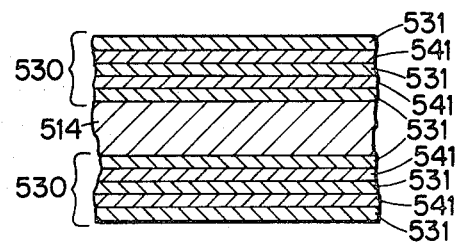

FIG. 5b shows a further variant of the FIG. 5 species in which each coating 530 is composed of serially alternating sub-layers of stiff material 531 and ductile material 541, both of very thin dimension. The coating process is accomplished in the same manner as for producing the article of FIG. 3 with the addition of the ductile material sub-layers 541, either in the same pass as a next adjacent sub-layer 531, in a separate consecutive pass, or in separate alternate cycles (i.e. coat 531 on both sides, then coat 541 on both sides, then 531, then 541, etc.).

The product of FIG. 5b may be a useful article, per se, similar to the manner of usage of the FIGS. 5, 5a products. Alternatively, the FIG. 5b product may be the basic unit of lamination as shown with respect to the species of FIGS. 3–4.

Figure 6:
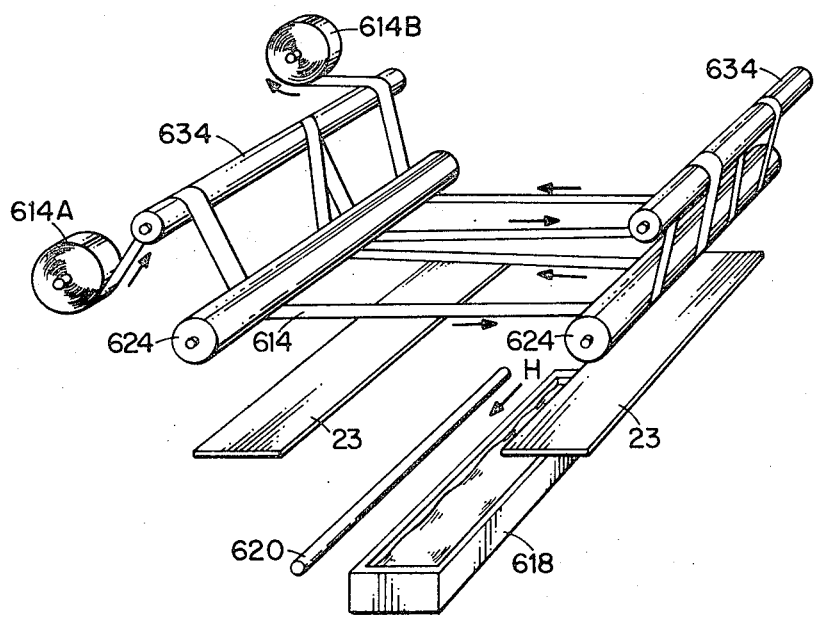
FIGS. 6–7 are schematic drawings showing apparatus used in other species of process of the invention for manufacture of the composite reinforcement.

FIG. 6 is a schematic sketch of an apparatus for production of the product of FIG. 3 on long webs of substrate material 614. The substrate is fed from a source roll 614A to a wind-up roll 614B passing several times back and forth over rollers 634 and 624 and above a source 618 of coating vapors heated by an electron emitter 620 assisted by a magnetic field (direction indicated by arrow H). The substrate web is turned over to present opposite faces to the coating vapors in alternate passes over source 618. The web guiding apparatus is constructed and arranged so that a greater amount of time is spent by the web passing over the coating source than in passing over the guide rolls 624, 634.

Figure 7:
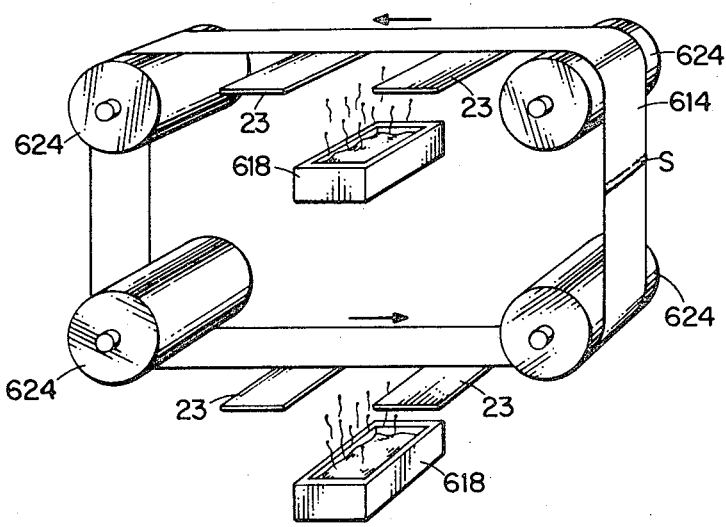

In the FIG. 7 apparatus a web 614 is spliced at 5 to form an endless belt and passed over rolls 624 and over two sources 618 to accomplish similar coating of opposite faces in succession.

As another variation of apparatus, the FIG. 1 approach could be applied to multiple strip form substrates using a conventional rotary jig metallizer of the type customarily used for metallizing costume jewelry. A source and gun (such as 18, 20 in FIG. 1) could be mounted in such apparatus.

In the FIG. 6 and FIG. 7 species, masks 23 are provided to avoid acute angle deposition of coating which is important as noted above in connection with FIG. 1a.

The time between coating passes in each cycle of two side coating of sub-layers may be referred to as lag time. The criterion has been expressed above with respect to several species that lag time should be less than coating time. A related criterion is that total dwell time (time to coat one face plus two lag times) should be less than the time necessary to form a monolayer of contaminant species. For instance at a coating chamber pressure of $10^{-6}$ mm. Hg, approximately two seconds would be required to form a monolayer of a contaminant species with a sticking coefficient of 0.5. Accordingly under such coating conditions the total dwell time should be less than two seconds.

It will be apparent to those skilled in the art that several variations can be made within the scope of the present invention. Accordingly, it is intended that the above disclosure shall be read as illustrative and not in a limiting sense.

What is claimed is:

1. A process for coating ductile plastic or metal core substrates with a stiff reinforcing material comprising the steps of:
   (A) providing a coating zone;
   (B) supporting a ductile metal or plastic core substrate having at least two surfaces in said zone;
   (C) providing a vaporizable source of a stiff reinforcing coating material in said zone and in line of sight relationship with said core substrate, said source being selected from the group consisting of aluminum oxide, boron, boron carbide, carbon, silicon carbide, titanium boride, titanium carbide, aluminum boride and beryllium;
   (D) establishing a vacuum in said zone;
   (E) heating the substrate and vaporizing the stiff material under the vacuum of (D), thereby causing vapors of said material to condense on and coat said core substrate; and
   (F) alternating the relative orientation of the substrate and the stiff coating material source in a series of repetitive cycles so that first one and then another of the surfaces of the substrate are presented towards the source and are thereby alternately coated in different time portions of each cycle to build a plurality of coating sub-layers on said surfaces, each such sub-layer having a thickness of not greater than 0.05 mil.

2. The process of claim 1 wherein the substrate has two opposing surfaces and is rotated relative to a stationary source in each cycle to coat said opposing surfaces.

3. The process of claim 2 wherein said subtrate is in film form.

4. The process of claim 3 wherein said film form substrate is an elongated web which is twice passed over a single stationary source in each cycle and wherein in the first pass one surface thereof is presented to the source and in the second pass the opposing surface is presented to the source.

5. The process of claim 4 wherein each pass comprises traversing the surface of the substrate web presented to the source back and forth over said stationary source.

6. The process of claim 1 wherein, in addition to the stiff material coating source, there is provided a separate source of ductile material vapors and the core substrate surfaces are alternately coated with a sub-layer of stiff material and a sub-layer of ductile material during each coating cycle.

7. The process of claim 1 wherein the temperature of the substrate is held substantially invariant for the duration of the cycle period.

8. The process of claim 1 wherein the cyclic coating of alternate faces is carried out in step form cycles with a major fraction of each cyclic period occupied by coating and a shorter lag time in changing the relative orientation of substrate and source.

9. The process of claim 1 wherein the substrate is moved relative to a stationary source.

10. A reinforcing product made by the process of claim 1.

References Cited

UNITED STATES PATENTS

| | | | |
|---|---|---|---|
| 3,356,525 | 12/1967 | Gutzeit | 117—119 X |
| 3,429,753 | 2/1969 | Wagner | 117—119 X |
| 3,455,723 | 7/1969 | Kern | 117—119 X |

CARL D. QUARFORTH, Primary Examiner

S. J. LECHERT, JR., Assistant Examiner

U.S. Cl. X.R.

117—107.1, 106 C, DIG. 10, 119, 130, 138.8, 135.1.